Patented June 4, 1940

2,203,416

UNITED STATES PATENT OFFICE 2,203,416

DYESTUFFS OF THE BENZANTHRONE SERIES

William H. Lycan, Wilmington, Del., assignor to E. I. du Pont de Nemours & Company, Wilmington, Del., a corporation of Delaware No Drawing. Application January 21, 1937, Serial No. 121,561

4 Claims. (Cl. 260—274)

This invention relates to the preparation of new and valuable dyestuffs of the benzanthrone series. It relates more particularly to the preparation of new Bz-1-arylaminobenzanthrones containing at least one 1,9-heterocyclic anthronylamino group attached to the benzanthrone nucleus, as more particularly illustrated by the formula

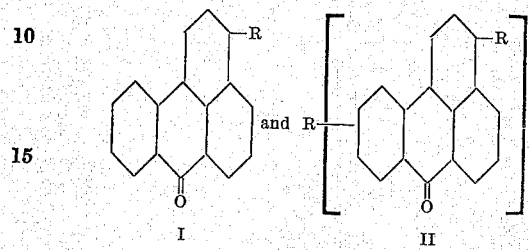

wherein R in Formula I and at least one R in Formula II is a 1,9-heterocyclic anthronylamino group and the second R in Formula II is an anthraquinonylamino radical attached to the benzanthrone nucleus; and to the new dyestuffs which are obtained by subjecting such aminocompounds to an alkaline condensation reaction.

In copending applications 51,078 and 51,079, filed November 22, 1935, the preparation of new and valuable gray dyestuffs is disclosed wherein Bz-halogen-benzanthrones are condensed with aminoanthraquinone-2,1(N)-benzacridones and the resulting mono- or di-imides ring-closed by means of alkaline condensing agents. I have now found that other new and valuable dyestuffs can be obtained if the aminoanthraquinone-2,1(N)-benzacridones of those applications are replaced by heteronuclear substituted anthrones, such as by aminoanthrapyrimidines, aminoanthraisothiazoles and -selenazoles, aminoanthrapyridones and N-methyl substituted pyrazolanthrones which contain a free amine group, and that these new dyestuffs dye in shades ranging from greenish gray to reddish gray, thereby making available a variety of new dyestuffs which have excellent fastness properties from which almost any shade of gray can be obtained. The dyestuffs of the present invention are prepared by condensing the heteronuclear substituted anthroneamines with Bz-1-halogen-benzanthrones or X:Bz-1-dihalogen-benzanthrones. In the condensation of the X:Bz-1-dihalogen-benzanthrones either one or both halogen atoms may be replaced by the aminoanthrone compounds, the second halogen being replaced by an anthraquinonyl radical. If desired, the Bz-1-halogen of the dihalogen-benzanthrones may first be replaced by employing theoretical amounts of the aminoanthrone and the residual halogen atom may then be further condensed with the same aminoanthrone or with an anthraquinonylamine, or the first (Bz-1) halogen may be replaced by an anthraquinonylamino group and the second halogen replaced by the aminoanthrone which carries the heterocyclic ring in the 1,9-positions. The mixed condensations are made possible by virtue of the fact that the Bz-1-halogen atom exhibits unusual reactivity and may be selectively substituted by aromatic amines.

The imides and di-imides are then subjected to an alkaline condensation such as, for instance, to the action of alcoholic potash, caustic potash in aniline, sodium anilide in aniline or alkalimetal alcoholates in aniline, to effect a ringclosure to the Bz-1-benzanthroneimide linkage to an acridine ring. The manner in which the imide group which is not in the Bz-1-position ringcloses is not definitely known, and therefore applicant does not attempt to limit the invention described in this application by any specific formula.

The dyestuffs are in general brown to black powders yielding violet-brown to green solutions in sulfuric acid. The color in sulfuric acid solution changes gradually on standing at room temperature or below, shifting usually toward the green. The products are soluble in alkaline hydrosulfite to form violet to brown to black shades from which cotton is dyed in greenish gray to reddish gray shades.

The following examples are given to more fully illustrate the invention. The parts used are by weight.

Example 1

7.5 parts of 5-amino-1,9-anthrapyrimidine, 10 parts of Bz-1-bromobenzanthrone, 7 parts of fused sodium acetate, and 0.3 part of copper acetate are suspended in 150 parts of naphthalene at 150° C. The melt is agitated with a copper blade agitator and heated to the reflux temperature. The temperature is maintained at reflux (214–215° C.) until none of the initial materials remain. The charge is then cooled to 150° C. and diluted by the rapid addition of 300 g. of solvent naphtha. The product is filtered at 60° C. and washed free from naphthalene with solvent naphtha. Solvent naphtha is removed by washing with alcohol, and the alcohol by washing with hot water. The residue is then washed with hot dilute hydrochloric acid solution and finally washed acid-free with hot water.

The product, when dry, is a chocolate-brown powder dissolving in concentrated sulfuric acid to a light brown solution. Addition of a small amount of formaldehyde changes the solution to a brownish black. The product is insoluble in alkaline hydrosulfite.

8 parts of this intermediate are dissolved in a melt consisting of 70 parts of caustic potash and 28 parts of methanol, at 135–140° C. The resulting melt is stirred at 140–145° C. for 1 to 2 hours and then drowned in water. After aeration the product is filtered and washed alkaline-free with hot water.

The product thus obtained, when dry, is a black powder yielding green solutions in concentrated sulfuric acid. It is soluble in alkaline hydrosulfite to a violet-blue vat from which cotton is dyed in bluish gray shades.

*Example 2*

10 parts of 5-amino-1,9-isothiazolanthrone and 12.5 parts of Bz-1-bromobenzanthrone are condensed in a manner similar to that described in Example 1. After the product is isolated as in the previous example, it is obtained, when dry, as glistening reddish brown crystals which dissolve in concentrated sulfuric acid to an olive-green solution. Addition of formaldehyde shifts the color of the solution to a bluish green. The product is insoluble in an alkaline hydrosulfite vat.

8 parts of this intermediate are fused as described in Example 1. There is obtained, after isolating and drying, a deep brown powder which dissolves in concentrated sulfuric acid giving an olive-green solution. The product is soluble with difficulty in alkaline hydrosulfite yielding a blue vat from which cotton is dyed in weak olive-green shades. The product contains substantially theoretical quantities of nitrogen and sulfur.

*Example 3*

12 parts of 4-amino-N-methyl-1,9-anthrapyridone and 14 parts of Bz-1-bromobenzanthrone are condensed in naphthalene as described in Example 1. The product, when dry, is a reddish blue powder insoluble in alkaline hydrosulfite. It dissolves to a reddish violet solution in concentrated sulfuric acid.

13 parts of this intermediate are fused in a melt composed of 100 parts of caustic potash and 40 parts of methanol at 140–145° C. After the reaction is complete, the product is isolated as a brownish black powder. It dissolves to a reddish brown solution in concentrated sulfuric acid, the solution turning olive-brown upon standing at room temperature. The product gives a brownish black alkaline hydrosulfite vat from which cotton is dyed in neutral gray shades.

*Example 4*

11.5 parts of Bz-1-bromobenzanthrone and 9 parts of 5-amino-N-methyl-1,9-pyrazolanthrone are condensed in naphthalene as described in Example 1. The resulting product is a black powder yielding olive-brown solutions in concentrated sulfuric acid. Addition of formaldehyde shifts the shade toward the green. The product is insoluble in alkaline hydrosulfite solution.

7 parts of this intermediate are introduced at 140° C. into a melt composed of 70 parts of caustic potash and 28 parts of methanol. After the fusion has been completed at 140–145° C. the product is isolated as a black powder. It is soluble in concentrated sulfuric acid to an olive-brown solution which turns green upon standing at room temperature. It is soluble in alkaline hydrosulfite to a violet-brown vat from which cotton is dyed in bluish gray shades.

*Example 5*

10 parts of 5-amino-1,9-isothiazolanthrone, 15 parts of 6:Bz-1-dibromobenzanthrone, 0.5 part of copper acetate and 15 parts of fused sodium acetate are added to 150 parts of molten naphthalene. The resulting melt is stirred with a copper blade agitator at the reflux temperature for 10 to 14 hours. The charge is cooled to 190° C. and 9 parts of 1-aminoanthraquinone and 50 parts additional naphthalene are added. The temperature is raised again to reflux and maintained until a sample of the reaction product is essentially free from bromine. The charge is then cooled to 180° C. and diluted by the addition of 600 parts of solvent naphtha. The product is filtered at 60° C. and isolated in the usual manner.

The product obtained, when dry, is a violet-brown powder dissolving in concentrated sulfuric acid to a yellow-green solution. Addition of formaldehyde shifts the shade to a greenish blue. The product is soluble with difficulty in alkaline hydrosulfite to yield a brown vat.

15 parts of this intermediate are fused at 140–145° C. in a melt consisting of 100 parts of caustic potash and 40 parts of methanol. The product, after isolation and drying, is a brownish black powder yielding a brownish black alkaline hydrosulfite vat from which cotton is dyed in brownish gray shades. The concentrated sulfuric acid solution of the dyestuff is green, becoming somewhat blue upon standing at room temperature.

*Example 6*

12 parts of 4-amino-N-methyl-1,9-anthrapyridone and 17.6 parts of 6-Bz-1-dibromobenzanthrone are condensed as described in Example 5. 10 parts of 1-aminoanthraquinone are then added and the condensation is continued as in that example. The resulting product is a blue-black powder dissolving to a violet solution in concentrated sulfuric acid. It is soluble with difficulty in alkaline hydrosulfite to a brownish gray vat but has little affinity for cotton.

After fusion, as described in Example 5, there is obtained a black powder yielding a brownish black alkaline hydrosulfite vat from which cotton is dyed in greenish gray shades. The product dissolves in concentrated sulfuric acid to form a violet-brown solution which turns greenish black upon standing at room temperature.

*Example 7*

10 parts of 5-amino-1,9-anthrapyrimidine and 16 parts of 6-Bz-1-dibromobenzanthrone are condensed as described in Example 5. 9.3 parts of 1-aminoanthraquinone are added and the condensation is continued. There is obtained a product giving red-brown solutions in concentrated sulfuric acid which turns greenish black with addition of formaldehyde.

After fusion, as described in Example 5, there is obtained a product yielding a violet-brown vat from which cotton is dyed in yellowish gray shades. The product is soluble in concentrated sulfuric acid to yield brown solutions which turn greenish black upon standing at room temperature.

7-Bz-1-dibromobenzanthrone or other X-Bz-1-dihalogenbenzanthrones obtained by direct halogenation of benzanthrone may be substituted for the 6-Bz-1-dibromobenzanthrone in the above examples.

Where the X-Bz-1-dihalogen-benzanthrone is employed, the amino-compounds mentioned in the above examples may be introduced in reverse order, or two moles of the same amino heterocyclic anthrone can be introduced into the molecule, to give dyestuffs which dye in gray shades. The second halogen (one not in Bz-1 position) may also be replaced by other aromatic amines such as aniline, p-toluidine, aminobenzoylaminoanthraquinones, etc., to give dyestuffs which also dye in gray shades when there is a heterocyclic anthroneamine group in the Bz-1 position.

The imide condensation may be carried out according to known procedure for preparing dianthraquinonylamides, and it will be obvious to those skilled in the art that substitutions may be made for the particular solvents, acid binding agents and copper catalysts employed without departing from the spirit of this invention. The temperatures used to effect the ring-closure may vary widely, although temperatures from 110 to 170° C. are preferred.

I claim:

1. As new dyestuffs, the alkaline condensation product of Bz-1-benzanthronylaminoanthrones containing a heterocyclic ring in the 1,9-position of the anthrone radical, said aminoanthrone being attached to the Bz-1 position of the benzanthronyl radical in one of the positions 4 and 5.

2. As new dyestuffs, the alkaline condensation products of Bz-1-benzanthronylaminoanthrones containing a heterocyclic ring in the 1,9-position of the anthrone radical, said aminoanthrone being attached to the Bz-1 position of the benzanthronyl radical in one of the positions 4 and 5 and at least one additional anthraquinonylamino radical attached to the benzanthrone nucleus.

3. The new dyestuffs of the probable general formula

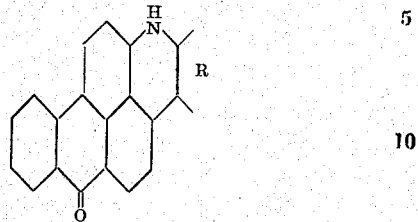

wherein R represents an anthrone molecule carrying in the 1,9-position a heterocyclic ring and being attached to the benzanthronylamino radical in one of the pairs of positions 4(N)3 and 5(N)6.

4. The alkaline condensation products of the compounds of the formula

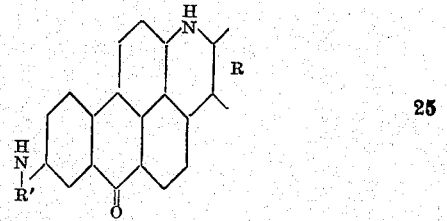

wherein R stands for an anthrone molecule carrying a heterocyclic ring in the 1,9-position and R' represents a radical of the class consisting of anthraquinonyl and 1,9-heterocyclic anthronyl radicals, said anthronyl radical being attached to the amino group in one of the positions 4 and 5.

WILLIAM H. LYCAN.